US007561098B2

(12) United States Patent
Christianson

(10) Patent No.: US 7,561,098 B2
(45) Date of Patent: Jul. 14, 2009

(54) SYSTEM AND METHOD FOR ESTIMATING AIRBORNE RADAR ANTENNA POINTING ERRORS

(75) Inventor: Paul E. Christianson, Seattle, WA (US)

(73) Assignee: Honeywell International Inc., Morristown, NJ (US)

(\*) Notice: Subject to any disclaimer, the term of this patent is extended or adjusted under 35 U.S.C. 154(b) by 238 days.

(21) Appl. No.: 11/458,925

(22) Filed: Jul. 20, 2006

(65) Prior Publication Data

US 2008/0018524 A1 Jan. 24, 2008

(51) Int. Cl.
*G01S 13/00* (2006.01)
(52) U.S. Cl. .................. 342/75; 342/99; 342/200
(58) Field of Classification Search .................. 342/75
See application file for complete search history.

(56) References Cited

U.S. PATENT DOCUMENTS

| 5,241,318 | A  | * | 8/1993  | Howard .................. 342/149 |
| 5,485,156 | A  | * | 1/1996  | Manseur et al. ............. 342/77 |
| 5,485,384 | A  |   | 1/1996  | Falconnet |
| 6,218,980 | B1 |   | 4/2001  | Goebel et al. |
| 6,417,803 | B1 | * | 7/2002  | de La Chapelle et al. ... 342/359 |
| 6,646,598 | B1 |   | 11/2003 | Timothy et al. |
| 6,707,415 | B1 |   | 3/2004  | Christianson |

OTHER PUBLICATIONS

James E. Bevington and Charles A. Marttila, Precision aided inertial navigation using SAR and digital map data, Honeywell Systems and Research Center, Minneapolis, MN; IEEE 1990, pp. 490-496.

\* cited by examiner

*Primary Examiner*—Thomas H Tarcza
*Assistant Examiner*—Timothy A Brainard

(57) ABSTRACT

Methods and systems for estimating and correcting airborne radar antenna pointing errors. The methods and systems include predicting expected received power from at least one scattering source using terrain elevation information, transmitting a radar signal to the at least one scattering source, measuring received power from the at least one scattering source, determining an antenna pointing error based on the predicted and measured received power, and adjusting an antenna angle, an input value, or other components based on the determined antenna pointing error. The methods and systems also include a radar processing and control unit for predicting expected received power from at least one scattering source using a model of the radar power measurement process that includes terrain elevation information, for measuring received power from the at least one scattering source, and for determining antenna pointing error based on the predicted and measured received power.

17 Claims, 4 Drawing Sheets

SYSTEM AND METHOD FOR ESTIMATING AIRBORNE RADAR ANTENNA POINTING ERRORS

BACKGROUND OF THE INVENTION

For numerous applications of radar, it is necessary to know the radar antenna pointing angles with some precision. However, errors in the measurement of antenna pointing direction can be caused by angular errors in the mounting of the antenna to a base. In the case of airborne radar, there are additional antenna pointing errors caused by aircraft attitude measurement errors introduced by the inertial navigation system (INS). While the base mounting errors are fixed, inertial errors are time varying, but on a relatively long time scale. If these errors exceed an allowed tolerance level, it is necessary to estimate the antenna pointing errors so the effects of these errors can be removed from further radar processing or so the antenna can be pointed in a direction that compensates for the error.

A method for estimating antenna tilt errors is described in U.S. Pat. No. 5,485,156 to Manseur, et al., which is incorporated herein by reference. The Manseur patent describes a system limited to using pairs of consecutive antenna scans and comparing returned signals averaged over particular defined regions to derive estimates of pitch, roll and elevation errors. These defined regions are defined by angular sectors about the aircraft location. Each comparison of signals from consecutive scans results in a tilt error measurement that is then filtered. This is limited in its ability to accurately estimate error and accurately correct for it.

Therefore, there exists a need for a method of improving estimation of airborne radar antenna pointing errors and accurately correcting for the errors.

SUMMARY OF THE INVENTION

This invention includes a system and method for estimating airborne radar antenna pointing direction errors. In an embodiment, the types of estimated direction angle errors are assumed to be constant or slowly varying in time. The method is operated in conjunction with a radar system that commands the pointing of an antenna beam in a wide array of directions. The radar system is used to observe a distribution of signal scattering objects whose mean scattering intensities are constant or slowly varying over time. An example of such a system might be one that performs radar ground mapping. The radar mode involves estimating the mean scattering intensities of the distribution of scattering objects by moving the antenna beam in both the azimuthal and elevation angular directions. Measurements are made of power received from targets when each target is illuminated at different angles with respect to the antenna beam axis (which typically is the direction of highest antenna directivity).

This invention is based on the idea that a comparison of a measurement of received power with a prediction of received power based on previous measurements provides information on antenna pointing direction error. In an example embodiment, the magnitude of the pointing error is substantially less than the antenna beam width, and the antenna beam radiation pattern is known. If the received power measured is greater than that predicted, then an angular pointing error is indicated in the direction toward the target with respect to the antenna beam axis. For example, if the target is known to be in a direction (above/below) the antenna beam axis and the measured power exceeds the prediction, this indicates a true pointing angle at a (higher/lower) elevation angle respectively than the indicated pointing angle. Likewise, if the measured power is less than the prediction, and the target is known to be in a direction (above/below) the antenna beam axis, this indicates a true pointing angle at a (lower/higher) elevation angle respectively than the indicated pointing angle.

One should note that the above described logic results in an indication of the sign of the pointing error, not an estimate of the amount of error. An estimate of the value of the error for each measurement is complicated by error in the estimates of target scattering intensity and by noise in the measurement of received power (i.e., signal fluctuation from a compound target). Fortunately, the time scale of variation of the pointing errors is long in an example embodiment, which allows long time constant filtering to obtain high quality pointing error estimates.

Because of the geometries of a radar system observing scattering patches of ground, the pointing errors most observable using the technique described here are errors in vertically measured angles. These types of errors can be caused by errors in pitch and/or roll attitude of the antenna mount or in the inertial navigation system (INS). Pitch and roll errors in the mounting of the antenna are assumed to be constant. Pitch and roll errors from the INS are essentially indistinguishable from the corresponding errors in the mount, except that they are expected to have some time variation, albeit slowly varying.

The combined pitch and roll errors are estimated using the values for the comparisons of power measurement to predictions. The process takes advantage of the expectation that the pitch contribution to the vertical pointing error is proportional to the cosine of the azimuth angle and the roll contribution to the error is proportional to the sine of the azimuth angle. Therefore, the pitch error can be estimated by correlating the power measurement comparison with the cosine of azimuth. Likewise, the roll error can be estimated by correlating the power measurement comparison with the sine of azimuth. In addition, in some embodiments, an error is estimated that is independent of azimuth. This type of error may be due to a bias error in the elevation angle position measurement of the antenna, for example.

The invention includes methods and systems for estimating and correcting airborne radar antenna pointing errors. The methods and systems include: predicting expected received power from at least one scattering source using terrain elevation information, antenna beam characteristics, antenna pointing angle, aircraft position, range-time, and estimates of signal scattering; transmitting a radar signal to the at least one scattering source; measuring received power from the at least one scattering source; determining an antenna pointing error based on the predicted and measured received power; and adjusting an antenna angle, an input value, or other components based on the determined antenna pointing error. The methods and systems also include a radar processing and control unit that: predicts expected received power from at least one scattering source using terrain elevation information, antenna beam characteristics, antenna pointing angle, aircraft position, range-time, and estimates of signal scattering; measures received power from the at least one scattering source; and determines antenna pointing error based on the predicted and measured received power.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
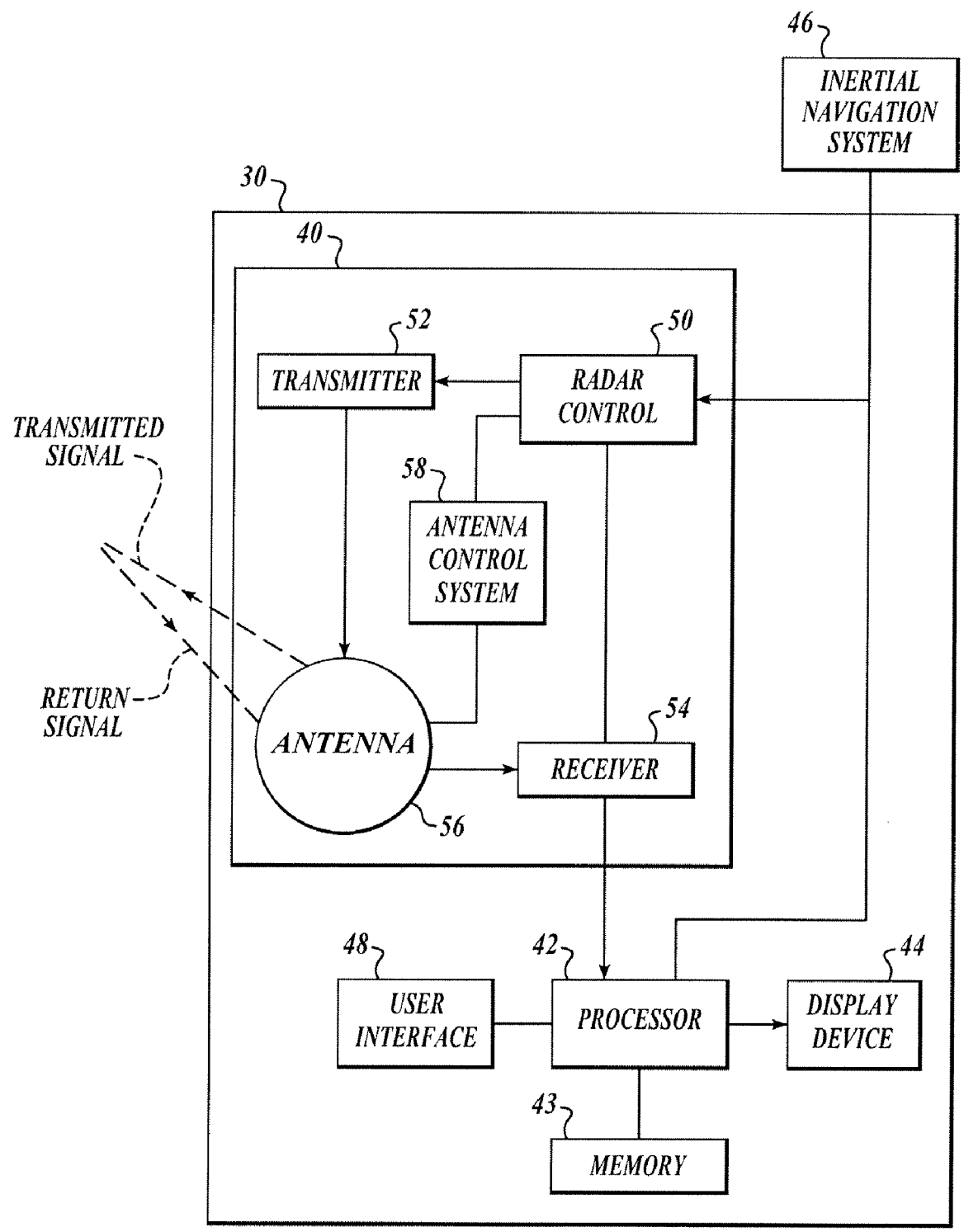
FIG. 1 is a diagram of a system including an embodiment of the present invention.

FIG. 1 is a diagram illustrating a system 30 formed in accordance with an embodiment of the present invention. The system 30 includes a radar subsystem 40 that includes a radar processing and control unit 50 in signal communication with a transmitter 52, a receiver 54, and an antenna control system 58. In some embodiments, the radar processing and control unit 50 includes a radar memory (not shown). The radar subsystem 40 also includes an antenna 56 that is in signal communication with the transmitter 52 and the receiver 54 and is connected to the antenna control system 58. The system 30 also includes a processor 42 in signal communication with a memory unit 43, a display device 44, a user interface 48, the radar processing and control unit 50, and the receiver 54. The system 30 is in signal communication with an Inertial Navigation System (INS) 46 that is in signal communication with the radar processing and control unit 50 and the processor 42. A terrain elevation information database (not shown) is also in signal communication with the radar processing and control unit 50 in some embodiments. In some embodiments, the terrain elevation information database is from an Enhanced Ground Proximity Warning System (EGPWS) database that is in signal communication with the radar processing and control unit 50. In other embodiments, the terrain elevation information database is located in the memory 43 and is accessed by the radar processing and control unit 50 via the processor 42. In other embodiments, the terrain elevation information database is stored in a memory (not shown) within the radar processing and control unit 50, or is located in secondary storage (not shown) in data communication with the radar processing and control unit 50 and accessed as needed by the radar processing and control unit 50.

During the system 30 operation, the radar processing and control unit 50 directs the transmitter 52 to transmit radar signals via the antenna 56. The transmitted signals leave the antenna 56, and scattering objects reflect the transmitted signals that return to the antenna 56 as return signals and are received by the receiver 54. The return signals are then processed by the radar processing and control unit 50. The radar processing and control unit 50 also directs the antenna control system 58 to position the antenna 56 in a variety of directions in both azimuth and elevation so that a broad area can be scanned from an aircraft or vehicle in which the system 30 resides. Sensors (not shown) within the antenna control system 58 provide information about antenna position, such as antenna elevation angle and azimuth angle, as inputs to the radar processing and control unit 50 in some embodiments. Elevation angle is the vertical angle orthogonal to, and measured from, the plane defined by the aircraft longitudinal and lateral axis to the boresight of the antenna 56 beam. Azimuth angle is the horizontal angle measured in the plane defined by the aircraft longitudinal and lateral axis and measured from the aircraft longitudinal axis to the position of the antenna beam projected onto the defined plane. In other embodiments, the transmitter 52 and the receiver 54 may be combined in a single transceiver unit. The processor 42 is used to generate display signals from the received and processed radar signals which are then displayed on the display device 44. Attitude data such as pitch and/or roll information is obtained from the INS 46, which provides this information as inputs to the radar processing and control unit 50. In some embodiments, the radar processing and control unit 50 uses this information in the process of predicting received power from scattering objects and in calculating antenna position.

Figure 2:
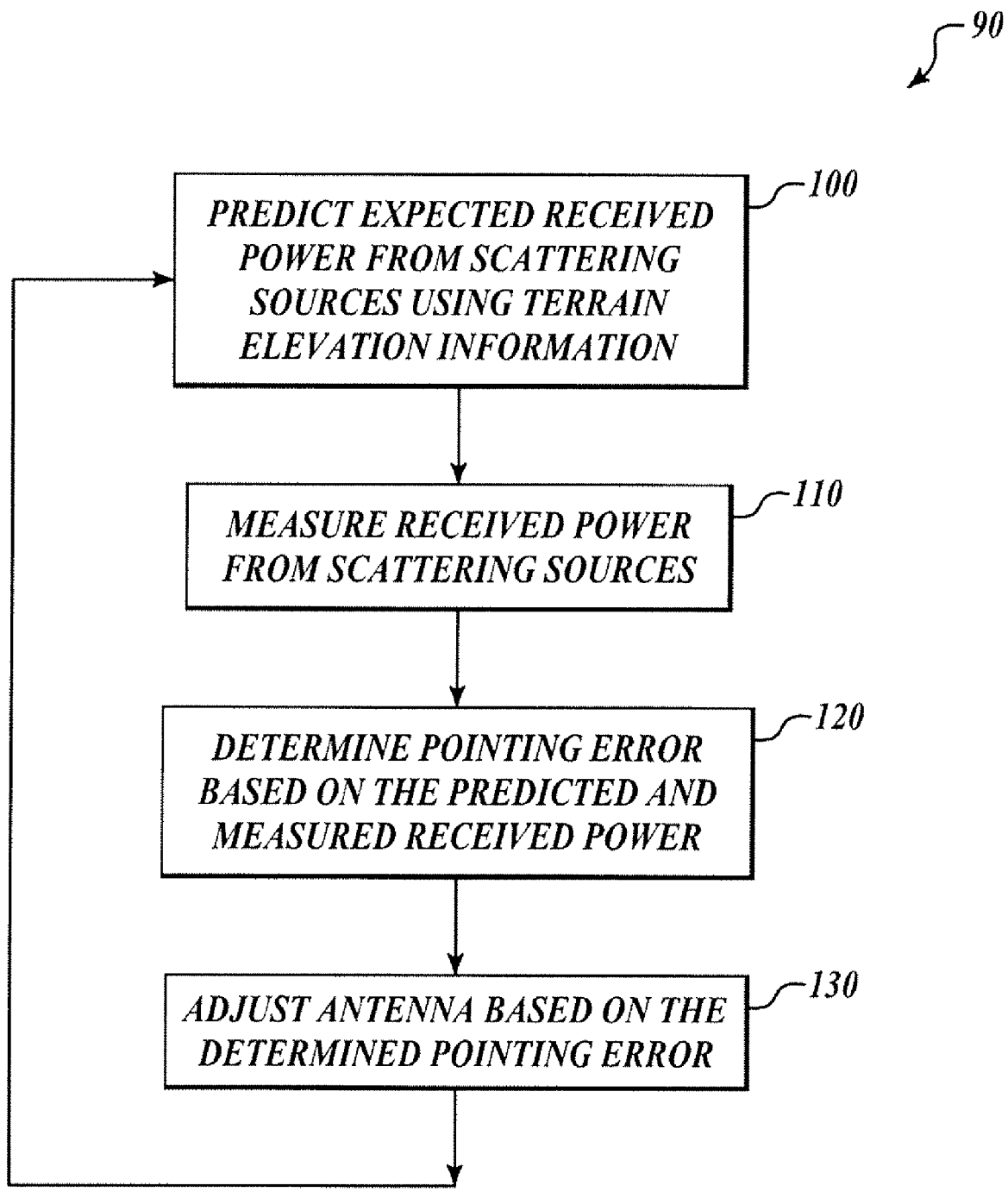
FIGS. 2 and 3 illustrate a flowchart of an example method performed by the system shown in FIG. 1.

FIG. 2 is a flowchart of a method 90 for estimating airborne radar pointing errors and correcting for any errors. In an embodiment, the estimation of pointing error is accomplished by comparing the measurement of power received in a returned radar signal to a prediction of the expected received power for the returned radar signal based on a model of the measurement process and knowledge of the spatial distribution of scattering sources and their scattering intensities. The method 90 begins at a block 100 where the expected received power from scattering sources using terrain elevation information is predicted. In an example embodiment, this is done using a ground mapping radar mode such as is described in U.S. Pat. No. 6,707,415 to Christianson, which is incorporated herein by reference. The prediction of power uses a model of the measurement process that includes antenna beam characteristics, antenna pointing angle, aircraft position, range-time, estimates of signal scattering, and terrain elevation information. The spatial distribution of scattering sources is defined with the aid of a terrain elevation database. Estimates of scattering intensities from the scattering sources are obtained using power measurements obtained while scanning the antenna 56 beam to illuminate the ground. The antenna 56 is scanned in azimuth, with the start of each scan preceded by stepping the antenna 56 tilt (i.e. elevation angle) so that different patches of ground are illuminated at different elevation angles with respect to the beam axis. In general, it is preferred that each patch of ground be illuminated at elevation angles both above and below the antenna 56 beam axis with equal probability by adjusting tilt on subsequent antenna scans. As an example, the prediction processing is conducted by the radar processing and control unit 50 and the predicted value is stored for later comparison with the measured received power.

The block 100 is followed by a block 110 where received power from scattering sources is measured. As an example, this is conducted by the radar processing and control unit 50 and the value is stored for later comparison with the predicted received power. Next, at a block 120, the pointing error is estimated based on the predicted and measured received power. Then, at a block 130, the antenna 56 is adjusted based on the estimated pointed error. However, in other embodiments, estimated antenna pointing error values are used to adjust pitch, roll, and antenna position information rather than adjusting the antenna pointing itself directly. For example, attitude inputs from the INS such as pitch and roll and inputs from position sensors associated with the antenna 56 are adjusted in some embodiments.

In some embodiments, the process 90 is performed for each antenna 56 pointing angle and for each range bin. Additionally, in some embodiments, it is an iterative process and after the antenna 56 is adjusted in block 130, the process begins again at the block 100 to obtain better error values after a number of iterations.

Figure 3:
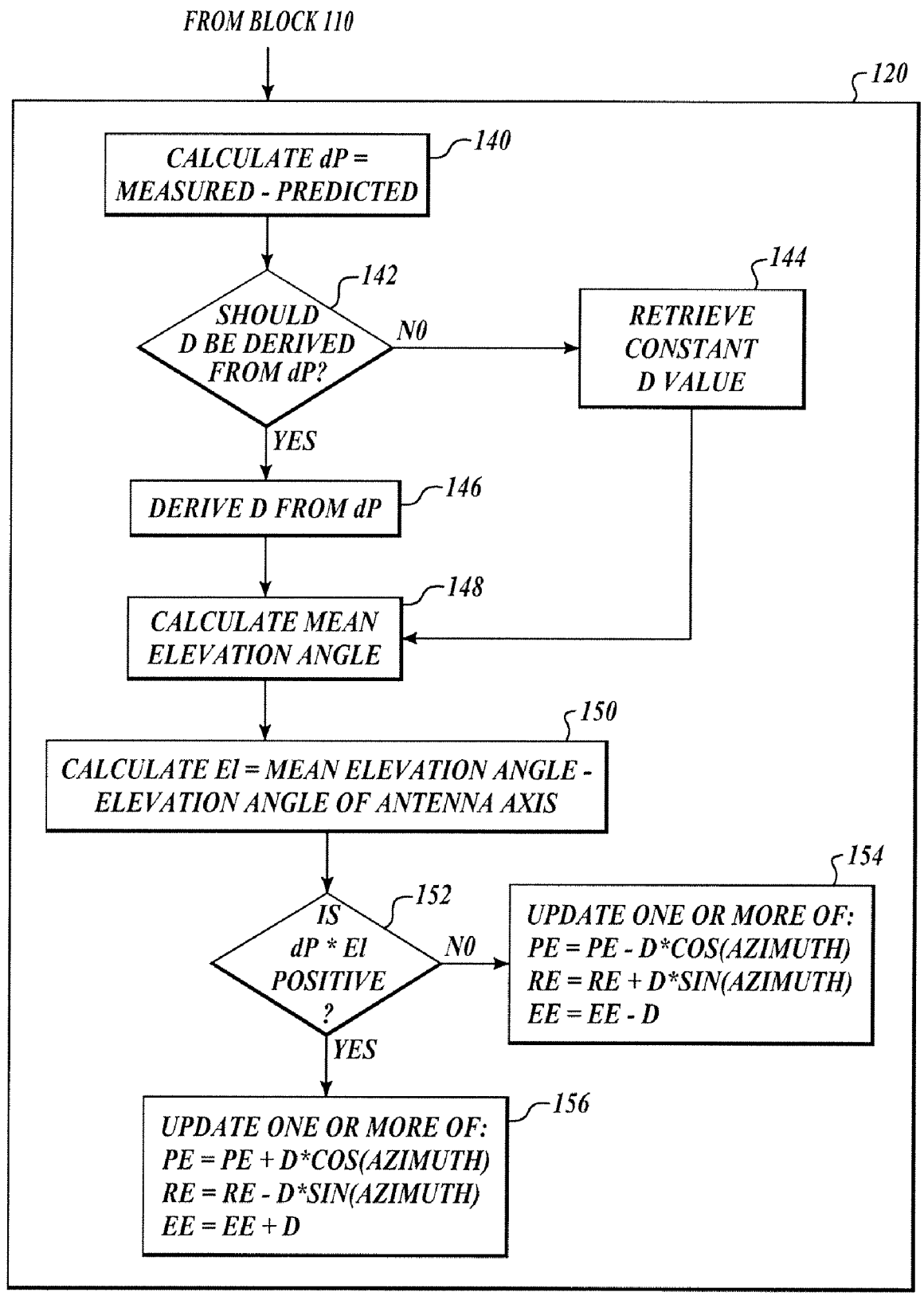

FIG. 3 is a flowchart showing additional details for the block 120 shown in FIG. 2 in an example embodiment. The difference between measurement and prediction of received power from scattering sources is denoted by the variable dP. Other parameters used in the flowchart are:

PE=pitch error,
RE=roll error,

EE=elevation error,

D=a small angle value that is used to adjust the angular error estimates,

El=the calculated angular difference between the vertically measured mean angle to the set of targets used to model the measurement and the antenna axis.

The parameter PE estimates the errors that are correlated with the cosine of azimuth, RE estimates errors correlated with the sine of the azimuth, and EE estimates bias errors. PE, RE, and EE are all initialized to zero. One can extend the scheme to include higher order error components that correlate with sine and cosine of 2 times azimuth, 3 times azimuth, etc. Higher order errors might result from elevation error measurement devices with more complex variation with respect to azimuth. The value of D can be a sufficiently small constant value, or it can be related to the magnitude of dP. One reason to choose D based on the value of dP is to increase the rate of convergence. One example of doing so is to make D proportional to dP/(predicted power+measured power). If this example proportionality is used, large relative differences between measurement and prediction result in a relatively large adjustment in angle error estimate. The value of D is positive. The value of D chosen involves a tradeoff between filter bandwidth and noise in the estimation process. The choice of an appropriately small value for D allows tracking of any slowly varying error values, and low noise in the process. The actual value of D used involves a tradeoff between the rate of convergence and noise in the estimate. Larger values of D allow faster convergence, but when the process converges near the correct value such that the predicted power and measured power are relatively close, the larger D will cause more variation about the correct value.

First, at a block 140, dP is calculated as being the measured minus the predicted value for the received power from scattering sources. Next, at a decision block 142, it is determined whether D should be derived from dP. If the answer to the decision block 142 is YES, the block 146 follows where D is derived from dP. Next, at a block 148, the mean elevation angle is calculated. If the answer to the block 142 is NO, a constant D value is retrieved at a block 144 which is then also followed by the block 148. Following the block 148, at a block 150, El is calculated as being the mean elevation angle minus the elevation angle of the antenna axis. Next, at a decision block 152, it is determined whether the product of dP and El is positive. If the product of dP and El is not positive, then at a block 154, one or more of the error values are updated according to the following equations:

$$PE = PE - D^*\cos(\text{azimuth angle})$$

$$RE = RE + D^*\sin(\text{azimuth angle})$$

$$EE = EE - D$$

If at the decision block 152, the product of dP and El was determined to be positive, a block 156 follows where one or more of the error values are updated according to the following equations:

$$PE = PE + D^*\cos(\text{azimuth})$$

$$RE = RE - D^*\sin(\text{azimuth})$$

$$EE = EE + D$$

The updated angle errors estimated by processing the radar signals as described above are used to modify the antenna pointing direction value used for the next cycle of updates. This provides a feedback mechanism. The values of dP used in the updates typically are very noisy. However, the values tend to be biased in such a way that pushes the angle error estimates in the proper directions. As the correct error values are approached, the bias in dP tends to drop in value, indicating convergence on the correct values. Any slow variation in the angle errors will then be tracked.

In some embodiments, the antenna pointing direction value is corrected by adding PE and RE directly to the pitch and roll inputs to the radar processing and control unit 50 from the attitude sensor values provided by the INS 46. Alternatively, PE and RE are transformed as vectors using commonly known line of sight stabilization transformations into a second elevation error component different from EE. This second elevation error is then added to EE and the resulting sum is applied to the elevation positioning mechanism of the antenna 56. One way to apply elevation error correction, either EE or EE plus a PE and RE derived component to the elevation positioning mechanism is to add the elevation error to an elevation sensor output that is included in the antenna control system 58. The sensor may be a synchro shaft angle encoder or an optical shaft angle encoder attached directly to the antenna elevation axis or coupled to the axis via gears, for example. Another way to apply elevation error correction is to subtract the error from the desired elevation angle. The desired elevation angle is the angle computed by transforming the commanded tilt angle using the previously mentioned line of sight stabilization transformation.

Figure 4:
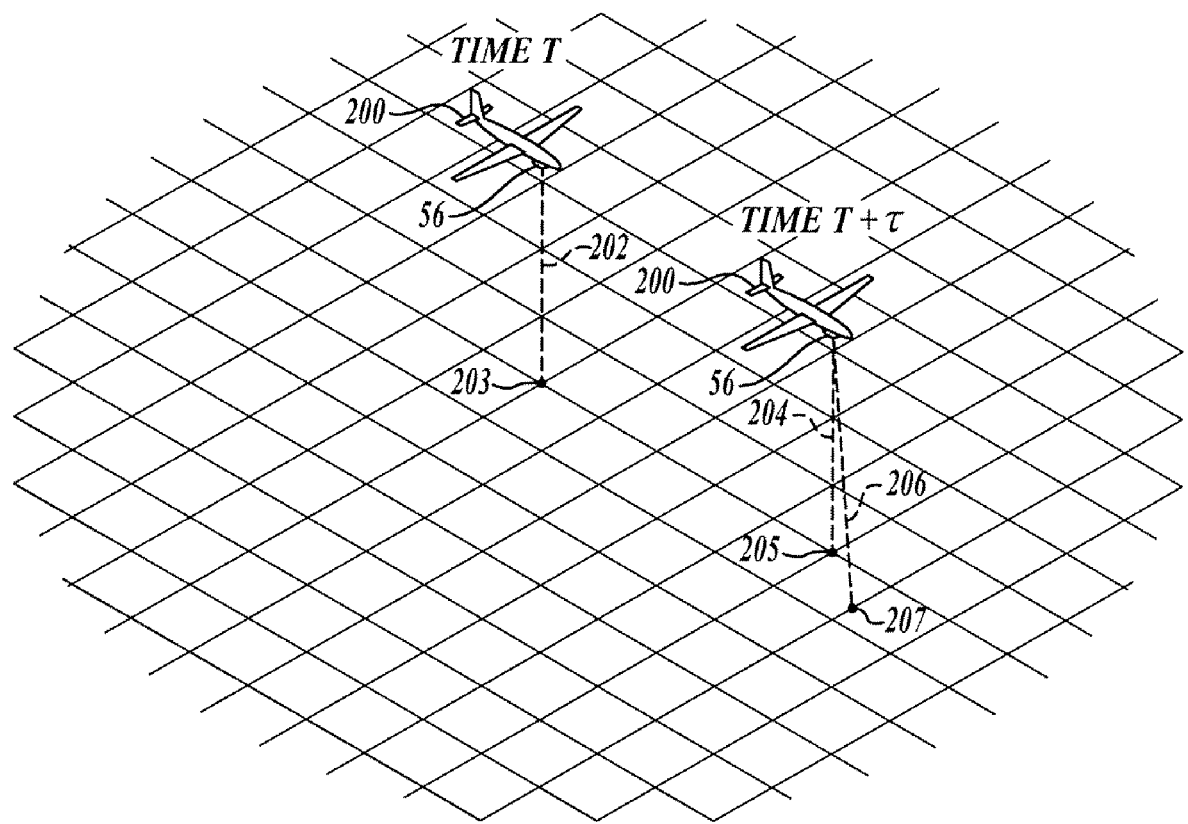
FIG. 4 is a diagram showing the use of the invention to adjust an antenna in an aircraft based on pointing errors found using the present invention.

FIG. 4 is a diagram illustrating an example application of the invention used in an aircraft 200 having an antenna 56 and a system shown in FIG. 1. At a time T, the aircraft 200 is pointing the antenna 56 along a first line 202 at first angular settings, resulting in illumination of a point 203 on the ground. Although the first line 202 is shown as being directed at a specific point 203, the antenna 56 beam will spread somewhat in actual operation. At a time T+τ, the plane 200 is shown to be pointing the antenna 56 along a second line 204 at the first angular settings. The second line 204 corresponds to the first line 202 and indicates the direction in which the antenna 56 would be pointed at time T+τ, if no adjustment for antenna pointing error is made. If the antenna 56 is pointed along the second line 204, a second point 205 is illuminated on the ground. If an adjustment for antenna 56 pointing error is made, for example by the method shown in FIGS. 2 and 3, the antenna 56 is directed along a third line 206 having at least one angular setting different than in the first angular settings at time T+τ. This results in a third point 207 being illuminated on the ground. This illustrates that the error values found using the system shown in FIG. 1 and the method shown in FIGS. 2 and 3 results in a new antenna 56 pointing orientation in some instances.

While the preferred embodiment of the invention has been illustrated and described, as noted above, many changes can be made without departing from the spirit and scope of the invention. For example, calculations involved in the estimation of antenna pointing errors could be conducted using a dedicated processor rather than the radar processing and control unit 50. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for estimating radar pointing errors comprising:
   a) receiving a previously determined prediction of expected received power from at least one scattering source, the previously determined prediction having used terrain elevation information;

b) transmitting a radar signal to the at least one scattering source;

c) measuring received power from the at least one scattering source; and d) determining an antenna pointing error based on the predicted and measured received power; and e) adjusting at least one of the following based on the determined antenna pointing error:
   an antenna elevation angle;
   an antenna azimuth angle;
   a pitch value input from an inertial navigation system (INS);
   a roll value input from the INS;
   an antenna elevation angle input value from an antenna elevation position sensor; and
   an antenna azimuth angle input value from an antenna azimuth position sensor.

2. The method of claim 1, wherein determining comprises:
calculating dP=the measured power−the predicted power;
calculating a mean elevation angle of the antenna to a group of scattering sources; calculating El=the mean elevation angle−elevation angle of the antenna;
if dP*El is not positive, updating one or more of a pitch error (PE), a roll error (RE), and an elevation error (EE) using the following formulas:

PE=PE−$D$*cos(azimuth angle);

RE=RE+$D$*sin(azimuth angle); and

EE=EE−$D$; and if dP*El is positive, updating one or more of PE, RE, and EE using the following formulas:

PE=PE+$D$*cos(azimuth angle);

RE=RE−$D$*sin(azimuth angle); and

EE=EE+$D$, wherein

D is a predefined positive constant.

3. The method of claim 1, further comprising repeating a-e.

4. The method of claim 1, wherein determining comprises:
calculating dP=measured power−predicted power;
deriving a positive D from dP;
calculating a mean elevation angle;
calculating El=the mean elevation angle−elevation angle of antenna axis;
if dP*El is not positive, updating one or more of a pitch error (PE), a roll error (RE), and an elevation error (EE) using the following formulas:

PE=PE−$D$*cos(azimuth angle)

RE=RE+$D$*sin(azimuth angle)

EE=EE−$D$; and if dP*El is positive, updating one or more of PE, RE, and EE using the following formulas:

PE=PE+$D$*cos(azimuth angle)

RE=RE−$D$*sin(azimuth angle)

EE=EE+$D$.

5. The method of claim 1, wherein determining comprises:
calculating dP=measured power−predicted power;
deriving a positive D from dP;
calculating a mean elevation angle;
calculating El=the mean elevation angle−elevation angle of antenna axis;
if dP*El is not positive, updating a pitch error (PE) and a roll error (RE) using the following formulas:

PE=PE−$D$*cos(azimuth angle)

RE=RE+$D$*sin(azimuth angle); and if dP*El is positive, updating PE and RE using the following formulas:

PE=PE+$D$*cos(azimuth angle)

RE=RE−$D$*sin(azimuth angle).

6. The method of claim 1, wherein determining comprises:
calculating dP=measured power−predicted power;
calculating a mean elevation angle;
calculating El=the mean elevation angle−elevation angle of antenna axis;
if dP*El is not positive, updating a pitch error (PE) and a roll error (RE) using the following formulas:

PE=PE−$D$*cos(azimuth angle)

RE=RE+$D$*sin(azimuth angle); and if dP*El is positive, updating PE and RE using the following formulas:

PE=PE+$D$*cos(azimuth angle)

RE=RE−$D$*sin(azimuth angle), wherein

D is a predefined positive constant.

7. The method of claim 1, wherein the method is performed for each antenna pointing angle.

8. The method of claim 7, wherein the method is performed for each range bin.

9. A system for estimating radar pointing errors comprising:
   an antenna control system in signal communication with a radar processing and control unit, the radar processing and control unit comprising:
      a first component for measuring received power from at least one scattering source; and
      a second component for determining antenna pointing error based on a previously determined prediction of received power from the at least one scattering source and the measured received power.

10. The system of claim 9, wherein the second component comprises:
   a first subcomponent for calculating dP=measured power−predicted power;
   a second subcomponent for calculating a mean elevation angle;
   a third subcomponent for calculating El=the mean elevation angle−elevation angle of antenna axis;
   a fourth subcomponent for determining if dP*El is positive;
   a fifth subcomponent for updating one or more of a pitch error (PE), a roll error (RE), and an elevation error (EE) using the following formulas if dP*El is not positive:

PE=PE−$D$*cos(azimuth angle)

RE=RE+$D$*sin(azimuth angle)

EE=EE−$D$; and a sixth subcomponent for updating one or more of PE, RE, and EE using the following formulas for if dP*El is positive:

PE=PE+$D$*cos(azimuth angle)

RE=RE−$D$*sin(azimuth angle)

EE=EE+$D$, wherein

D is a predefined positive constant.

11. The system of claim 9, further comprising:
an antenna control system in signal communication with the radar processing and control unit; and
an antenna connected to the antenna control system, wherein
the radar processing and control unit further comprises a third component for adjusting the antenna via the antenna control system based on the determined antenna pointing error.

12. The system of claim 11, wherein the third component adjusts the antenna elevation angle.

13. The system of claim 9, wherein the second component comprises:
a first subcomponent for calculating dP=measured power−predicted power;
a second subcomponent for deriving a positive D from dP;
a third subcomponent for calculating a mean elevation angle;
a fourth subcomponent for calculating El=the mean elevation angle−elevation angle of antenna axis;
a fifth subcomponent for determining if dP*El is positive;
a sixth subcomponent for updating one or more of a pitch error (PE), a roll error (RE), and an elevation error (EE) using the following formulas if dP*El is not positive:

PE=PE−$D$*cos(azimuth angle)

RE=RE+$D$*sin(azimuth angle)

EE=EE−$D$; and a seventh subcomponent for updating one or more of PE, RE, and EE using the following formulas for if dP*El is positive:

PE=PE+$D$*cos(azimuth angle)

RE=RE−$D$*sin(azimuth angle)

EE=EE+$D$.

14. The system of claim 9, wherein the second component comprises:
a first subcomponent for calculating dP=measured power−predicted power;
a second subcomponent for deriving a positive D from dP;
a third subcomponent for calculating a mean elevation angle;
a fourth subcomponent for calculating El=the mean elevation angle−elevation angle of antenna axis;
a fifth subcomponent for determining if dP*El is positive;
a sixth subcomponent for updating a pitch error (PE) and a roll error (RE) using the following formulas if dP*El is not positive:

PE=PE−$D$*cos(azimuth angle)

RE=RE+$D$*sin(azimuth angle); and a seventh subcomponent for updating PE and RE using the following formulas if dP*El is positive:

PE=PE+$D$*cos(azimuth angle)

RE=RE−$D$*sin(azimuth angle).

15. The system of claim 9, wherein the second component comprises:
a first subcomponent for calculating dP=measured power−predicted power;
a second subcomponent for calculating a mean elevation angle;
a third subcomponent for calculating El=the mean elevation angle−elevation angle of antenna axis;
a fourth sub component for determining if dP*El is positive;
a fifth subcomponent for updating a pitch error (PE) and a roll error (RE) using the following formulas if dP*El is not positive:

PE=PE−$D$*cos(azimuth angle)

RE=RE+$D$*sin(azimuth angle); and a sixth subcomponent for updating PE and RE using the following formulas if dP*El is positive:

PE=PE+$D$*cos(azimuth angle)

RE=RE−$D$*sin(azimuth angle), wherein

D is a predefined positive constant.

16. The system of claim 9, wherein the radar processing and control unit further comprises a third component for directing the first and second components to perform their functions for each antenna pointing angle.

17. The system of claim 16, wherein the third component also directs the first and second components to perform their functions for each range bin.

* * * * *